Aug. 14, 1956 F. T. NEWELL 2,758,852
COUPLING FOR THREADLESS PIPE WITH INDEPENDENT
SEALING AND GRIPPING MEANS
Filed Jan. 16, 1953 2 Sheets-Sheet 1
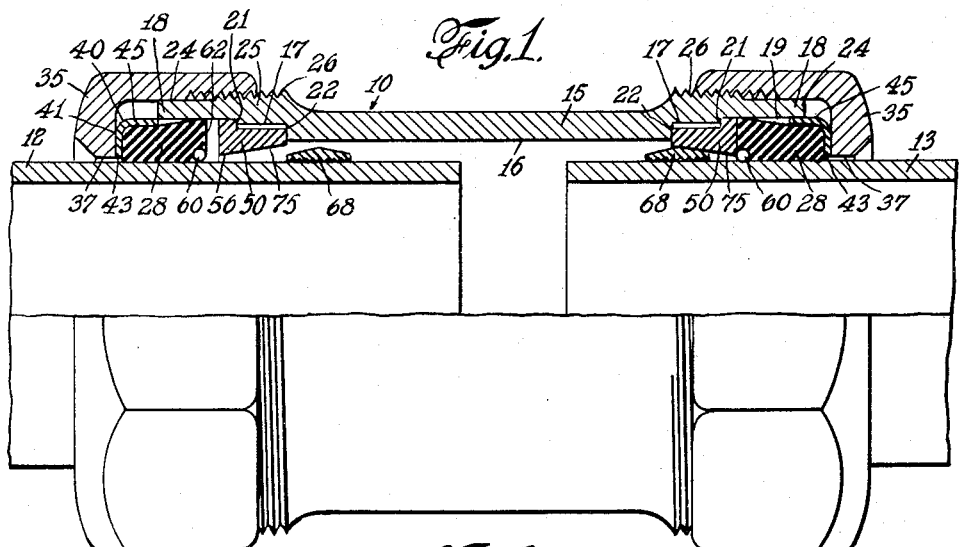
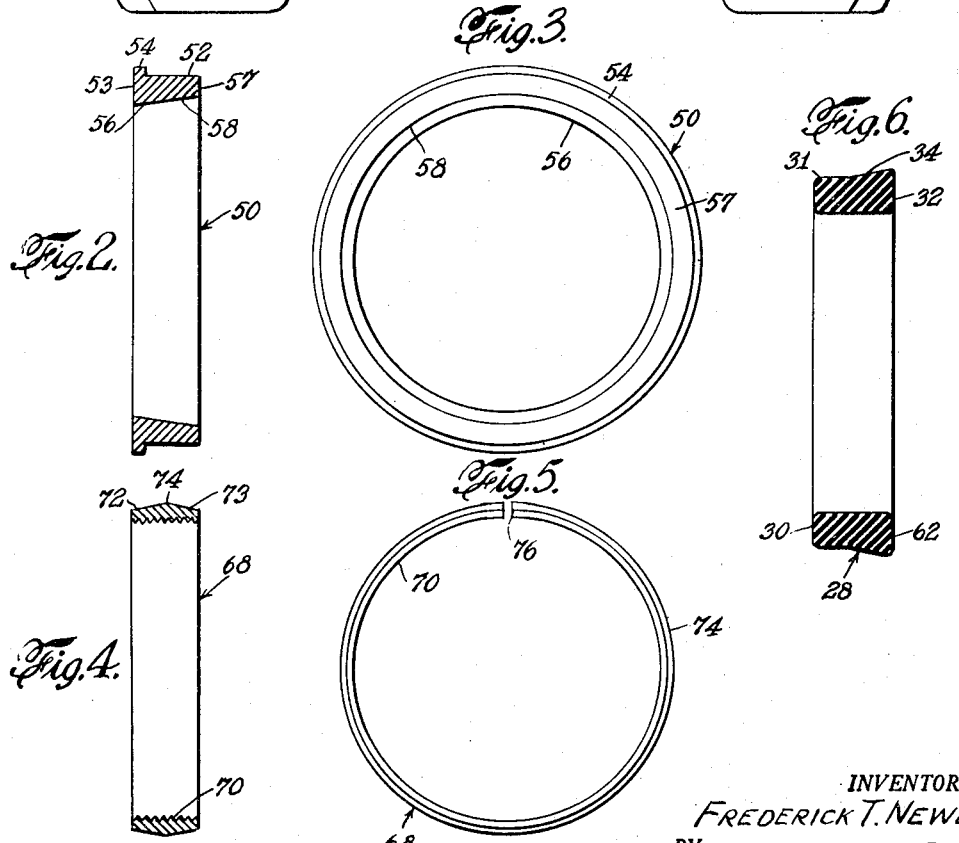
INVENTOR.
FREDERICK T. NEWELL
BY
Robert E. Burns
ATTORNEY

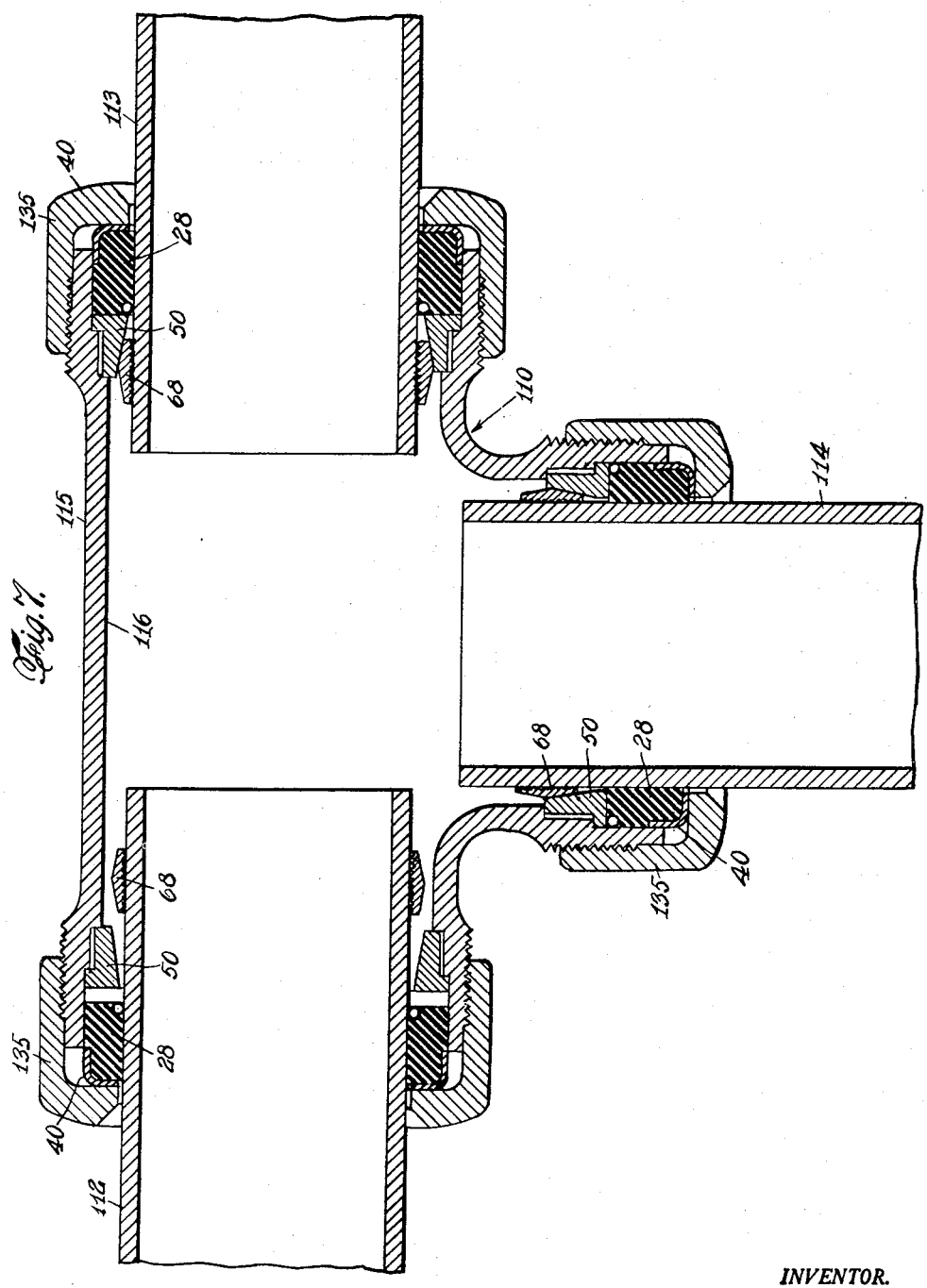

United States Patent Office 2,758,852
Patented Aug. 14, 1956

2,758,852

COUPLING FOR THREADLESS PIPE WITH INDEPENDENT SEALING AND GRIPPING MEANS

Frederick Thomas Newell, Bradford, Pa., assignor to Dresser Industries, Inc., Dallas, Tex., a corporation of Pennsylvania Application January 16, 1953, Serial No. 331,642

3 Claims. (Cl. 285—343)

This invention relates to couplings for pipe, tubing and the like, hereinafter referred to generically as "pipe," and is more particularly concerned with couplings which are effective for connecting sections of unthreaded pipe in flexible fluid-tight relationship while simultaneously withstanding longitudinal stress and preventing undesired outward axial displacement of the pipe sections.

In vertical pipe arrangements such, for example, as are employed in water wells and the like, which in many cases may be as much as 300 feet in depth and commonly are at least 100 to 150 feet deep, the couplings between the several sections of pipe which are necessary for making up a pipe line of sufficient length for such installations, must not only provide a fluid-tight joint between successive sections but must also resist the longitudinal stresses exerted by the weight of the pipe sections in order to prevent undesired withdrawal of the pipes from the coupling. The heavier the pipe, of course, the greater the longitudinal stress. Heretofore, for lack of more effective means, it has been common practice to join the pipe sections in such vertical pipe lines by means of ordinary screw couplings. Such couplings require the use of carefully threaded pipe and provide a rigid, non-yielding connection. It is common knowledge that threading a pipe weakens the pipe wall by materially reducing the wall thickness along the threaded portion. It has therefore been necessary to use rather heavy pipe so that the pipe walls will have sufficient strength notwithstanding the threads. Furthermore, in order to obtain a fluid-tight connection, it is necessary that the threads be very accurately cut, which greatly adds to the time and cost of making the installation. The rigidity of the connection obtained with a screw coupling, moreover, is a disadvantage in long vertical pipe installations of this type since vibrations and flexing forces cause an undue stress on the threaded connection.

In order to avoid the aforementioned disadvantages of screw couplings and, in addition, in order to facilitate the assembly of the pipe lines it has been proposed to use so-called "slip" couplings. This type of coupling eliminates the necessity for threading the pipe and greatly reduces the time required for assembly. In connecting pipe sections with a slip coupling it is merely necessary to insert the ends of the sections into the coupling and then to tighten the gasket compressing means to squeeze the gaskets into sealing engagement with outer surface of the pipes. The ordinary slip coupling of the type commonly used in the installation of horizontal pipe lines depends for its effectiveness upon the frictional engagement between the gaskets and the outside walls of the pipe sections. In vertical installations, however, where the weight of the line must be taken into account, this frictional engagement exerted by the gasket, while it provides a fluid-tight seal, is generally not adequate to withstand the longitudinal stresses continuously exerted by the line and, as a result, excess outward axial movement of the pipe in the couplings occurs. The various slip couplings heretofore proposed for vertical installations have, therefore, embodied means of one kind or another to withstand such longitudinal stresses. Such prior proposals have, however, not been entirely satisfactory since efforts to provide the necessary resistance to longitudinal stress have generally resulted in lessening the effectiveness of the gasket seal.

Some of the proposed prior constructions have, for example, been based on a locking arrangement in which the lock is frequently actuated during installation before the gaskets have been fully compressed, using the procedure normally followed in the installation of a coupling of this type. In other prior constructions, the locking elements, e. g. balls, have been of a type which are brought into locking engagement upon outward movement of the pipe sections from the coupling sleeve. In these couplings, however, the lock is sometimes not properly actuated or excessive outward movement of the pipes is necessary, and the most common disadvantage of this arrangement is that the sealing pressure of the gaskets is adversely affected during the movement of the locking elements into locking engagement. In some cases the seal is destroyed and leaking of the pipe line results.

Furthermore, many of the heretofore proposed lock couplings have involved relatively complicated constructions which make them difficult and expensive to manufacture as well as difficult to install properly, even by highly-skilled labor.

It is an object of the present invention to provide a slip coupling for use in vertical pipe installations, and in other installations in which strong longitudinal stresses are encountered, which avoids the disadvantages and shortcomings of prior couplings designed for such use.

It is another object of the invention to provide a coupling of the character indicated wherein actuation of the locking means does not adversely affect the sealing action of the gaskets and the gaskets remain under full sealing compression.

It is a further object of the invention to provide an improved locking means for slip couplings.

It is another object of the invention to provide a co-operating gasket and locking means construction for slip couplings which insures full gasket compression during actuation of the locking means.

It is still another object of the invention to provide a lock coupling wherein compression of the gasket may be effected to any desired degree without interfering in any way with the action of the locking means.

It is a further object of the invention to provide a locking slip coupling for vertical pipe installations and the like which is of relatively simple construction, economical to manufacture, and easily and effectively installed even by unskilled labor.

In accordance with the invention, there is provided a coupling comprising a central tubular sleeve or "middle ring" having threaded ends, gaskets for providing a fluid-tight seal between the middle ring and the pipe sections being coupled, locking elements each comprising a split metal ring having a reversely tapered outer peripheral surface and a serrated, pipe-engaging inner peripheral surface, locking cam rings for cooperation with the gasket and providing cam surfaces for engagement with the locking rings for actuating the coupling lock, and follower nuts engageable with the threaded ends of the middle ring for applying sealing pressure to the gaskets. The locking rings are constructed to grip the pipe sections by frictional engagement and to cooperate with the locking cam rings for increasing the frictional engagement to effectively prevent withdrawal of the pipes from the coupling, notwithstanding high axial stresses on the pipes.

It is a feature of the invention that the locking cam rings permit full gasket pressure and full locking action to occur simultaneously.

It is another feature of the invention that the locking rings may be brought into fully effective locking action regardless of the gasket pressure and without adverse effect upon the sealing action of the gaskets.

It is a further feature of the invention that the coupling can be installed rapidly and by unskilled labor without danger of improper or ineffective operation when in service in the pipe line.

Other objects and features of the invention will be apparent from the following detailed description of illustrative embodiments of the coupling of the invention and from the accompanying drawings wherein:

Fig. 1 is a longitudinal sectional view, partly in elevation of a lock coupling embodying features of the present invention, showing the coupling at the time of installation upon a pair of co-linear pipe sections;

Fig. 2 is a vertical sectional view of the locking cam ring shown in position in the coupling in Fig. 1;

Fig. 3 is an end elevational view of the locking cam ring shown in Figs. 1 and 2;

Fig. 4 is a cross-sectional view, on an enlarged scale, of the locking ring shown in Fig. 1;

Fig. 5 is an end elevational view of the locking ring shown in Fig. 4;

Fig. 6 is a longitudinal sectional view of the gasket employed in the coupling of the invention; and Fig. 7 is a sectional view of another embodiment of the invention.

Referring to the drawings, and more particularly to Figs. 1 and 2, the reference numeral 10 designates generally the locking coupling illustrated, which is shown in position to enclose the opposed ends of pipe sections 12 and 13. Coupling 10 includes a tubular sleeve or "middle ring" 15 having an interior defining a central cylindrical portion 16, intermediate portions 17 of greater diameter, and end portions 18 of still greater diameter which provide gasket recesses. Gasket recesses 19 are separated from the intermediate portions 17 by shoulders 21 and the portions 17 are separated from the central portion 16 by shoulders 22. The outer surface of each end of sleeve 15 is formed with a cylindrical section 24 extending from the free outer edge of the sleeve to an annular section 25 which is provided with external threads 26. To facilitate the description and understanding of the structure of coupling 10, reference will be made hereinafter only to one end of the coupling, but it will be understood that the coupling is symmetrical and that each end is of the same construction.

Disposed in the outer part of gasket recess 19 is a gasket 28 which is annular in form, and is shaped to conform to the gasket recess 19 and the adjacent structural portions of the coupling. Thus, as shown more particularly in Fig. 6, the gasket 28 has a first or outer portion 30 with a cylindrical outer surface 31 and a second or inner portion 32 which has an outwardly tapered surface 34. The gasket 28 is formed from rubber or rubber composition, this term being used generically to include natural and synthetic rubbers and other elastomeric compounds, or compositions having like properties and characteristics. The material is relatively firm and solid but sufficiently resilient and elastic to flow under pressure to conform to the surfaces between which it is confined. Advantageously, the gasket 28 is formed from a rubbery composition which is relatively resistant to attack by hydrocarbon gases and oils. Examples of such resistant rubbery compositions which are suitable for use are neoprene (polychloroprene) and butadiene-acrylonitrile copolymers, such as those known commercially by the trade designations Buna N or GR–A. The invention is, however, not limited to these specific materials, and particularly when special resistance to gases and oils is not required, any rubbery composition having the above-specified characteristics may be employed.

The gasket 28 is compressed and urged into sealing engagement between the pipe section 12 and the sleeve 15 by means of a follower nut 35 which is provided with internal threads for engagement with the threads 26 of the sleeve and with a central aperture 37 of sufficient diameter to receive the pipe. In order to confine and protect the gasket 28 and to prevent frictional resistance by the gasket when the follower nut 35 is rotated in tightening or loosening the coupling, there is provided a suitable gasket follower 40. In the embodiment illustrated in Fig. 1, the gasket follower 40 takes the form of a substantially cup-shaped annular member conveniently stamped or otherwise formed from a metal sheet to define a body portion 41 formed with an aperture 43 substantially the size of aperture 37 of follower nut 35, and a peripheral flange 45 which is dimensioned to be received in the annular space between the wall of the gasket recess 19 and the cylindrical outer surface 31 of gasket 28. When the follower nut 35 is tightened, the follower 40 is urged axially inwardly and axially compresses the gasket 28 in the gasket recess 19, thereby causing the gasket to expand radially inwardly into tight sealing engagement with the pipe.

Inward axial movement of the gasket 28 upon tightening of follower nut 35 is opposed by a locking cam ring 50 which is seated partially in the gasket recess 19 and partially in the intermediate portion or recess 17. As shown more particularly in Figs. 2 and 3, locking cam ring 50 has a cylindrical outer surface 52, provided at one end adjacent end face 53 with a radially-extending flange 54 which, as shown in Fig. 1 is the portion of the ring which extends into gasket recess 19 and engages shoulder 21. The inner peripheral surface of ring 50 defines a pipe aperture 56 radially opposite flange 54, and tapers outwardly from the aperture 56 to the opposite face 57 of the ring to provide a cam surface 58, the purpose of which will be described hereinafter. When the main body portion of the locking cam ring 50 is seated in the intermediate recess 17, its inner edge surface engages the shoulder 22 and the ring is thus held against inward axial movement relatively to sleeve 15. As seen in Fig. 1, the larger end face 53 of the ring 50 provides an abutment surface for engagement by the gasket 28.

When the follower nut 35 is tightened, as above described and as shown at the right in Fig. 1, there may in some cases be a tendency for the gasket 28 to be extruded into the interior of the sleeve 15 through pipe aperture 56 of ring 50. In order to avoid possible damage to the gasket by such extrusion, there is advantageously provided at the inner edge of the gasket, an expansible metallic ring 60. The expansible ring 60 is advantageously in the form of an annular spring helix which is molded into the rubber composition of the gasket by known means. The endless helix 60 is preferably imbedded in the gasket 28 so as to be substantially flush with the inner face of the gasket and also with the outer end surface 62. When the gasket is compressed by the action of the nut 35 and the follower 40, the expansible ring is forced between the face 53 of the locking cam ring 50 and the surface of the pipe and thus effectively closes the annular aperture between these adjacent surfaces.

In accordance with the invention, the necessary locking of the coupling with respect to the pipe, while maintaining full gasket sealing action, is provided by the action of a spring locking ring which cooperates with locking cam ring 50. As shown in Figs. 4 and 5, the locking ring 68 has a serrated inner peripheral surface 70 and reversely sloped outer surfaces 72 and 73 which taper from the end faces of the ring to a peripheral ridge 74 centrally of the ring. The tapering surfaces 72 and 73 are of substantially the same slope as the tapered inner cam surface 58 of locking cam ring 50. This slope is advantageously 5 to 15° from the horizontal axis, preferably 10°. The locking ring 68 grips the pipe section 12 and follows the axial movements of the pipe. When outward axial forces are exerted upon the pipe, the locking ring is carried by the pipe into the annular space 75 defined between the cam surface 58 and the surface of pipe 12 and the sloping surface 72 engages cam surinner serrated surface 70 into firmer engagement with face 58. The resulting cam wedging action presses the the pipe and further outward movement of the pipe is prevented. The reversely tapered outer surface of the locking ring insures effective locking action regardless of the side of the locking ring which faces the cam ring.

It is well-known that the outside diameter of commercial pipes of any given size vary from what may be termed the "nominal" size, some pipe having a diameter greater than the nominal size and some having a lesser diameter. Thus, for each given "nominal" pipe size, the outside diameters of commercial pipes vary from what may be termed "minimum" pipe to what may be called "maximum" pipe. If pipe couplings are to be of general utility, this variation in pipe size must be taken into account. This variation has been at least partly responsible for some of the difficulties encountered in the use of many of the locking couplings heretofore proposed.

It is a feature of the invention that the lock coupling is of such construction that it is effectively used with maximum pipe, minimum pipe or pipe of nominal size. Regardless of the variation from nominal size, an effective, strong, thrust-resistant, fluid-tight connection between the pipe sections is obtained with facility. In all cases the gasket is brought smoothly into sealing engagement, and the locking ring firmly locks the pipe in the coupling without in any way adversely affecting the sealing action of the gasket.

In constructing the coupling, the followers 40, the follower nuts 35, and the locking cam rings 50 are all formed of sufficient size and with pipe apertures of sufficient diameter to receive the maximum pipe of the specified nominal size, with the tapered wall portion of the cam ring 50 being of sufficient diameter to receive at least part of the locking ring. The locking rings 68 are resilient and of such diameter that they will grip the pipe with spring tension even when the pipe is of minimum size.

As shown in Figs. 4 and 5, the locking ring is advantageously split as indicated at 76 so that its diameter of the ring can be varied to conform to the external diameter of the pipe with which the locking ring is associated. The serrations on the inner surface of the ring may be in the form of threads or they may be parallel grooves, but in any case their edges should be sharp. The locking ring may, however, take various forms, i. e. it may be the split ring 68, or it may for example, be an expansible discontinuous ring formed from circumferentially-spaced ring segments which are interconnected by an expansible cord and engage only selected portions of the outer surface of the pipe. In all cases, however, the ring has a reversely sloping outer surface and a serrated inner surface for engagement with the surface of the pipe to be locked.

Moreover, while the locking rings shown in the drawings have been referred to as having a serrated inner pipe-engaging surface, the term "serrated" is intended to include as well a knurled surface, or other like friction-increasing surface.

It will be understood that the invention is not limited to a coupling for two pipes of the same nominal diameter but may also be embodied in a reducing coupling, in a coupling T, or other coupling fitting. In Fig. 7, for example, there is shown a T constructed in accordance with the invention, parts corresponding to those shown in Fig. 1 being given like reference numerals to which 100 has been added. The middle ring 115 of the T 110 illustrated has opposed open ends for reception of pipe sections 112 and 113 and a branch 114 which communicates centrally with the interior of middle ring 115 for receiving the pipe section 112. Each of the three open ends of the middle ring is constructed to receive gasket 28, follower 40, follower nut 35, locking ring 68 and locking cam ring 50, which have the structure of the corresponding parts in Fig. 1.

When the coupling of the invention is to be installed, the follower nuts 35, the followers 40, the gaskets 28, and the locking cam rings 50, in that order, are first slipped over the free ends of the pipe sections in the relative relationships shown in Fig. 1. Next, the locking rings 68 are snapped into place into frictional engagement with the pipe sections and these rings are spaced inwardly from the free ends of the sections to some extent. The pipe sections with the coupling parts thus seated upon them are then stabbed into the middle ring 15 and the follower nuts 35 are moved into loosely threaded engagement with the threaded ends of the middle ring, as shown at the left in Fig. 1. The pipes are then withdrawn slightly from the middle ring to bring the tapered surfaces 72 of the locking rings 68 into engagement with the sloping cam surfaces 58 of the locking cam rings 50, as shown in the branch connection in Fig. 7. The follower nuts are then tightened and as each follower nut is tightened upon the middle ring, the gaskets are compressed into sealing engagement with the pipe and are forced inwardly against the faces 53 of the locking cam rings 50, as shown at the right in Figs. 1 and 7. It will be seen that the locking rings will be engaged with the cam surfaces of the locking cam rings and will be brought into firm frictional engagement with the outer surface of the pipes being coupled whether these pipes are "maximum," "minimum" or "nominal." Depending upon the size of the pipe, the locking rings extend further or less into the apertures of the locking cam rings defined by the cam surfaces 58. In any case, effective locking engagement will occur and the pipe will be securely locked against axial displacement, while the sealing action of the gasket is maintained at its maximum. Forces on the pipes which tend to withdraw them from the coupling only serve to increase the locking action of the locking ring, since the cam action of the sloping outer surface of the locking ring and the tapered inner cam surface of the locking cam ring presses the serrations of the locking ring more firmly into the pipe.

There is thus produced an effective lock against longitudinal separation of the pipe sections joined by the coupling with simultaneous fluid-tight sealing of the joint. A coupling constructed in accordance with the invention is suitable for use in connecting the sections of vertical pipe lines, such as those in wells and the like, permitting the assembly of such lines rapidly and easily without need for special tools or skilled labor, and providing a securely-jointed line having fluid-tight, flexible joints which take up any vibrational or bending stresses to which the line may be subjected in service.

While the invention has been illustrated and described with reference to certain preferred embodiments thereof, it will be obvious that various changes and modifications in addition to those above-mentioned may be made without departing from the scope of the invention as defined in the appended claims. It will further be understood that, insofar as they are not mutually incompatible, the various features and details of construction of the several embodiments shown and described are interchangeable with one another. It is intended, therefore, that all matter contained in the foregoing description and in the drawings shall be interpreted as illustrative only and not as limitative of the invention.

What I claim and desire to secure by Letters Patent is:

1. A pipe coupling for smooth, plain end pipe comprising a tubular sleeve having a threaded end providing an internal annular recess, a gasket member received in said recess, a follower member threadedly engageable with said sleeve and movable axially inwardly in relation to said sleeve to compress said gasket member in said gasket recess, said sleeve being formed with a shoulder adjacent said recess and spaced axially inwardly from the threaded end of the sleeve, a continuous annular means disposed at least partly in said recess with said gasket member but axially inwardly thereof and prevented from inward axial movement by positive engagement with said shoulder, said annular means being adapted to be engaged with the axially inner radial face of said gasket, said annular means having an axially-outwardly tapered radially inner surface, radially expansible and contractible locking means disposed in said sleeve axially inwardly of said annular means, said locking means being normally free from interconnection with the pipe to be coupled having an outer surface of substantially the same tapered slope as that of the tapered surface of the annular means for frictional engagement therewith and an opposite serrated surface for frictional gripping engagement with the pipe upon radial compression of said locking means, said follower member being adapted to compress said gasket member against said annular means and into sealing engagement with the surface of the pipe and against said annular means without axial displacement of said annular means, and said annular means engaging said locking means axially inwardly of said gasket and when held against inward axial movement by said shoulder, whereby said annular means and said locking means interengage independently of the action of said gasket member upon said annular means.

2. A pipe coupling for smooth, plain end pipe comprising a tubular sleeve having a threaded end providing an internal annular recess, a gasket member received in said recess, a follower member threadedly engageable with said sleeve and movable axially inwardly in relation to said sleeve to compress said gasket member in said gasket recess, said sleeve being formed with a shoulder adjacent said recess and spaced axially inwardly from the threaded end of the sleeve, a continuous annular means disposed at least partly in said recess with said gasket member but axially inwardly thereof and prevented from inward axial movement by positive engagement with said shoulder, said annular means being adapted to be engaged with the axially inner radial face of said gasket, said annular means having an axially-outwardly tapered radially inner surface, radially expansible and contractible locking means disposed in said sleeve axially inwardly of said annular means, said locking means being normally free from interconnection with the pipe to be coupled having an outer surface comprising two adjoining portions of substantially the same tapered slope as that of the tapered surface of the annular means for selective frictional engagement therewith and an opposite serrated surface for frictional gripping engagement with the pipe upon radial compression of said locking means, said follower member being adapted to compress said gasket member against said annular means and into sealing engagement with the surface of the pipe and against said annular means without axial displacement of said annular means, and said annular means engaging said locking means axially inwardly of said gasket and when held against inward axial movement by said shoulder, whereby said annular means and said locking means interengage independently of the action of said gasket member upon said annular means.

3. A pipe coupling for smooth, plain end pipe comprising a tubular sleeve having a threaded end providing an internal annular recess, a gasket member received in said recess, a follower nut threadedly engageable with said sleeve and movable axially inwardly in relation to said sleeve to compress said gasket member in said gasket recess, said sleeve being formed with a shoulder adjacent said recess and spaced axially inwardly from the threaded end of the sleeve, said follower nut having an end wall defining a pipe aperture, a continuous annular means disposed at least partly in said recess with said gasket member but axially inwardly thereof and prevented from inward axial movement by positive engagement with said shoulder, said annular means being adapted to be engaged with the axially inner radial face of said gasket, said annular means having an axially-outwardly tapered radially inner surface, radially expansible and contractible locking means disposed in said sleeve axially inwardly of said annular means, said locking means being normally free from interconnection with the pipe to be coupled having an outer surface of substantially the same tapered slope as that of the tapered surface of the annular means for frictional engagement therewith and an opposite serrated surface for frictional gripping engagement with the pipe upon radial compression of said locking means, said follower nut being adapted to compress said gasket member against said annular means and into sealing engagement with the surface of the pipe and against said annular means without axial displacement of said annular means, and said annular means engaging said locking means axially inwardly of said gasket and when held against inward axial movement by said shoulder, whereby said annular means and said locking means interengage independently of the action of said gasket member upon said annular means, a cup-shaped follower disposed between the wall of said follower nut and the gasket to permit rotation of the follower nut without frictional engagement with the gasket, and an expansible ring molded into the radially inner and axially inner edge of the gasket member.

References Cited in the file of this patent
UNITED STATES PATENTS

| 1,159,845 | Kidd | Nov. 9, 1915 |
| 1,604,580 | Jacques | Oct. 26, 1926 |
| 1,646,660 | Prince | Oct. 25, 1927 |
| 1,743,315 | Callender | Jan. 14, 1930 |
| 1,793,455 | Buchanan | Feb. 24, 1931 |
| 2,021,745 | Pfefferle et al. | Nov. 19, 1935 |
| 2,460,032 | Risley | Jan. 25, 1949 |